C. A. NUTTING.

Improvement in Coupling for Divided Axles.

No. 127,637. Patented June 4, 1872.

Witnesses:
John Becker.
W. A. Graham.

Inventor:
C. A. Nutting
Per _____ Attorneys.

UNITED STATES PATENT OFFICE.

CHARLES A. NUTTING, OF MACON, GEORGIA.

IMPROVEMENT IN COUPLINGS FOR DIVIDED AXLES.

Specification forming part of Letters Patent No. 127,637, dated June 4, 1872.

Specification describing a new and Improved Divided Car-Axle Coupling, invented by CHARLES A. NUTTING, of Macon, county of Bibb, and State of Georgia.

My invention is an improvement in the class of divided car-axles which are coupled by a tube formed in two parts, both tapering longitudinally each way from the center, and secured together upon the axle by means of circular bands or collars. The invention consists in the construction and arrangement of the several parts of the coupling, as hereinafter described, whereby the same is adapted in a superior manner for exclusion of dust, retention of oil or other lubricant, and for resisting strains caused by heavy loads.

This coupling-tube is chambered out internally at the center to provide room for collars on the inner ends of the divided axle, by which they are prevented from escaping endwise, and the end of one has a socket in which a point on the other bears to reduce the surfaces sustaining the friction when they bear hard against each other; also, to aid in keeping the two parts of the axle in line with each other.

Figure 1:
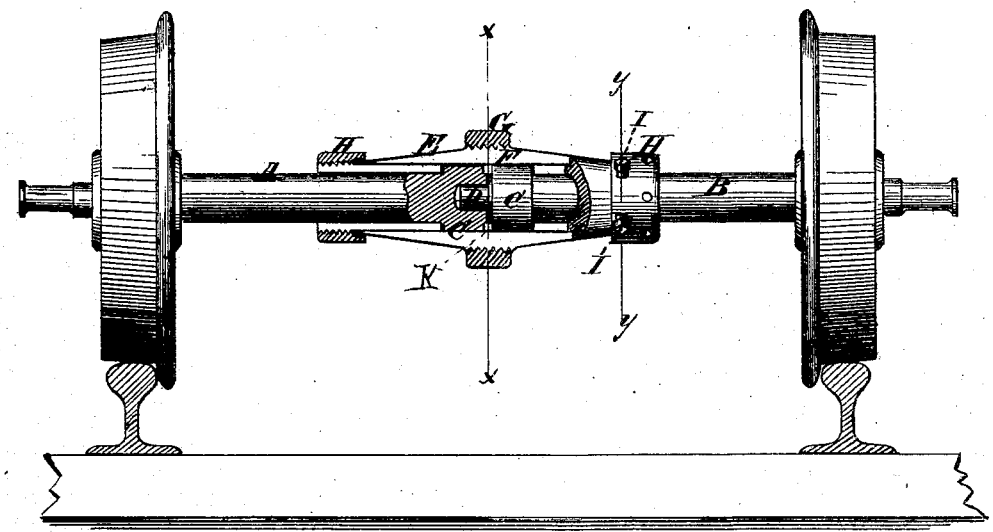
Figure 2:
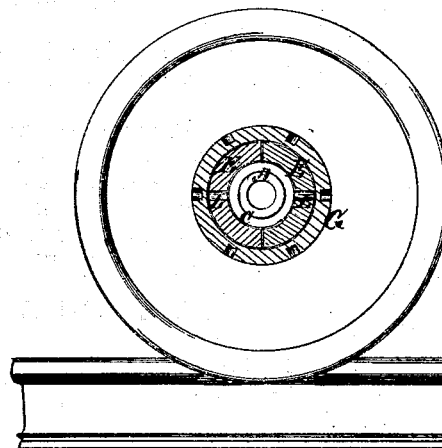
Figure 3:
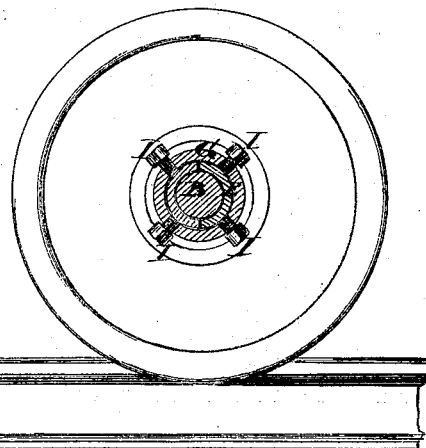

In the accompanying drawing, Figure 1 is partly a horizontal section and partly a side elevation of my improved coupling; Fig. 2 is a cross-section on the line $x\,x$; and Fig. 3 is a cross-section on the line $y\,y$.

Similar letters of reference indicate corresponding parts.

A and B are the two parts of the axle, each having a collar, C, on their inner end, and one having a socket in the center of the end for the reception of a cylindrical projection, D, on the other. E represents the coupling-tube formed of the semicircular parts tapering toward each end from the center, where there is a screw-threaded part, F, of the largest portion of the outer surface, whereon a collar, G, screws, so as to bind the two parts firmly together. Each end portion is similarly threaded, and has a collar, H, screwed on. These end collars bind on the taper of the tube so as to press the ends of the latter very snugly on the shaft, to exclude the dust and prevent the oil from escaping. I represents set-screws in these end collars, screwing against the tube to preven the collars from working loose. The middle collar may also be so secured, if preferred. A chamber, K, is formed between the ends of the parts A B of the axle, by turning off the corners of the collars, for oil which will be introduced through a hole, L, made through the tube in the part F, so as to be covered by the collar G when in position.

Having thus described my invention, I claim as new and desire to secure by Letters Patent—

In combination with the divided axle A B, the improved coupling, consisting of the tube formed in two parts, tapered as shown, and provided with the central screw-thread, the screw-collar G applied to cover the oil-hole L, and the screw-collars H, all constructed and arranged as specified.

CHARLES A. NUTTING.

Witnesses:
   H. T. POWELL,
   W. P. GOODALL.